Sept. 20, 1966     H. N. DEAN ETAL     3,273,988
APPARATUS FOR PRODUCING ALL-GLASS MULTIPLE SHEET GLAZING UNITS
Filed July 6, 1964     2 Sheets-Sheet 1
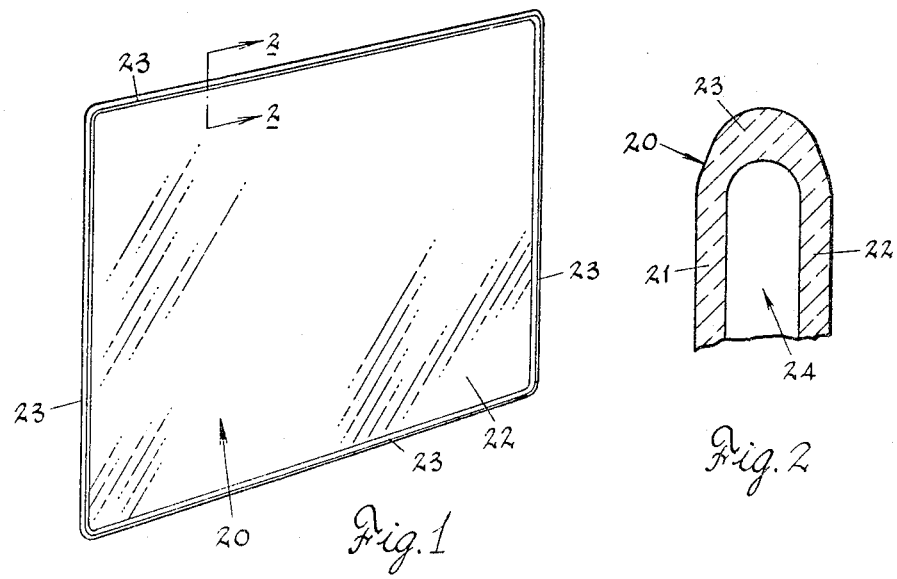
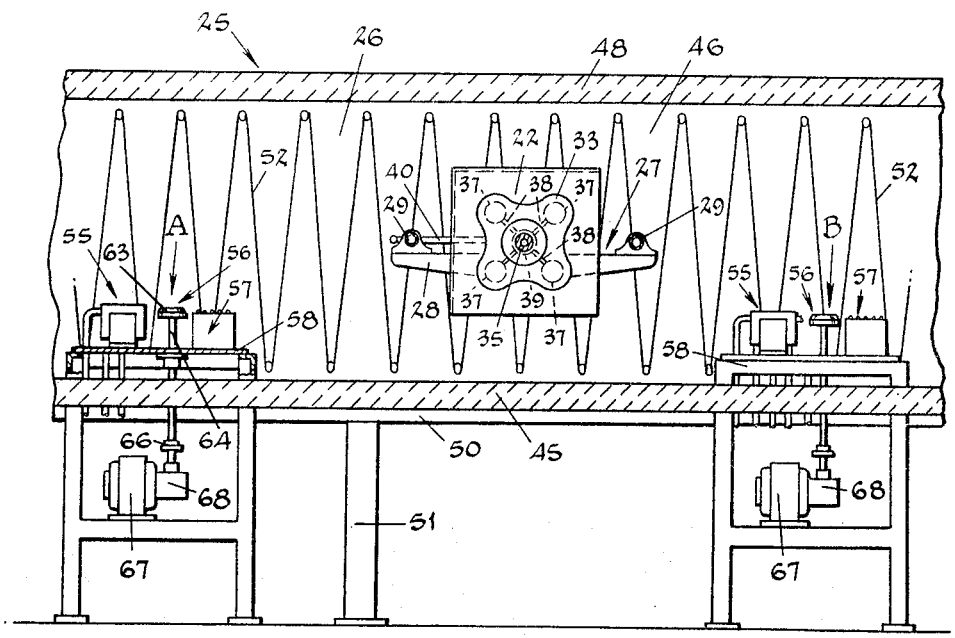
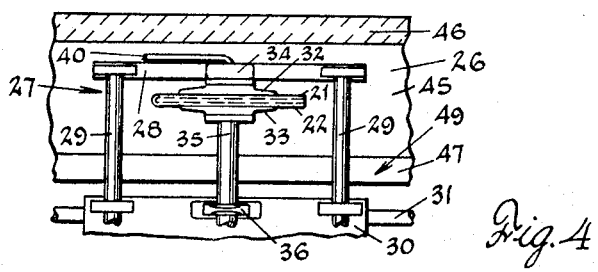

Sept. 20, 1966   H. N. DEAN ETAL   3,273,988
APPARATUS FOR PRODUCING ALL-GLASS MULTIPLE SHEET GLAZING UNITS
Filed July 6, 1964   2 Sheets-Sheet 2

INVENTORS
Harry N. Dean,
BY John C. Morgan, Jr. and
Lester H. Flaherty
Nobbe & Swope
ATTORNEYS United States Patent Office 3,273,988
Patented Sept. 20, 1966

3,273,988
APPARATUS FOR PRODUCING ALL-GLASS MULTIPLE SHEET GLAZING UNITS
Harry N. Dean, Perrysburg, John C. Morgan, Jr., Toledo, and Lester H. Flaherty, Maumee, Ohio, assignors to Libbey-Owens-Ford Glass Company, Toledo, Ohio, a corporation of Ohio
Filed July 6, 1964, Ser. No. 380,249
5 Claims. (Cl. 65—152)

The present invention relates broadly to the production of all-glass multiple sheet glazing units composed of two sheets of glass sealed together in spaced face-to-face relating entirely around the edges thereof to provide a dead air space therebetween.

More particularly, this invention is concerned with an improved apparatus for heating the marginal edge portions of the spaced sheets of glass to a temperature at which they can be fused to one another to form a peripheral edge wall.

In general, glazing units of the above-described character are produced by supporting the sheets in spaced face-to-face relationship in substantially vertical planes for movement along a predetermined path past sealing devices operable to fuse the marginal edge portions of the sheets together. These sealing devices comprise means for heating the marginal edge portions of each of the glass sheets to the fusion temperatures of glass and forming means which engage the heated edge portions and bring them into fusion contact with one another. The sealing of the edges of the sheets is thus accomplished by a continuous procedure in which the edges of the sheets are progressively fused together as the sheets are advanced along the path.

The general aim of the invention is to restrict the heating of the edge portions of the sheets to localized areas which will then be deformed to form the edge wall thereby to produce a glazing unit of the above-described character having substantially flat planar sides and a uniform semi-circular edge wall.

The primary object of the invention is to provide an apparatus of the above character having an improved fusion burner operable to direct heat onto closely defined localized areas of the sheet and away from the remaining areas of the sheet.

Another object is to provide a burner having nozzles or tips positioned inwardly of the marginal edges of the glass sheets and operable to direct heating frames outwardly toward the marginal edge portions.

Other objects and advantages of the invention will become more apparent during the course of the following description when taken in connection with the accompanying drawings.

In the drawings, wherein like numerals are employed to designate like parts throughout the same:

FIG. 1 is a perspective view of an all-glass multiple sheet glazing unit of the type with which this invention is concerned;

FIG. 2 is a sectional view taken along line 2—2 of FIG. 1;

FIG. 3 is a fragmentary vertical longitudinal sectional view of an apparatus provided by the present invention for producing the all-glass multiple sheet glazing units;

FIG. 4 is a fragmentary plan view of the apparatus of FIG. 3;

Figure 5:
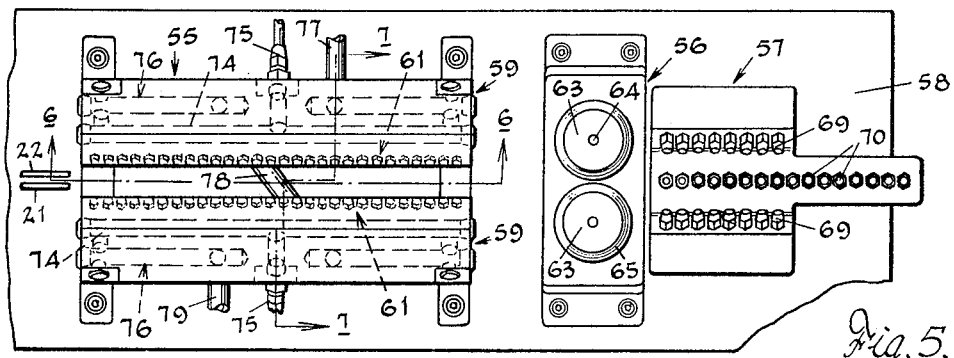
FIG. 5 is a plan view of one of the sealing stations of the apparatus.
Figure 6:
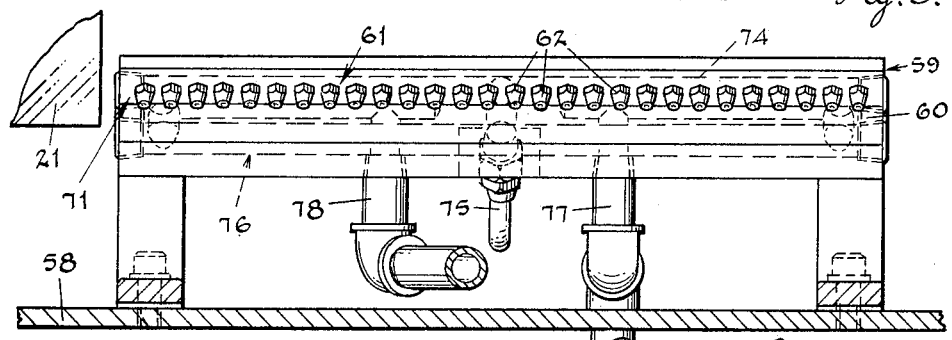
FIG. 6 is a view taken along lines 6—6 in FIG. 5.

With reference now to the drawings, there is shown in FIGS. 1 and 2, an all-glass multiple sheet glazing unit 20 which comprises two spaced sheets of glass 21 and 22 having the edge portions thereof fused to one another to provide edge walls 23 surrounding the unit and enclosing a sealed, dead air space 24 therebetween.

For purposes of illustration, the invention is shown in the drawings incorporated in one form of apparatus, generally designated by the numeral 25, for producing the all-glass multiple sheet glazing unit 20. As best shown in FIG. 3, the apparatus 25 includes a heating chamber or furnace 26 and a support means 27 for carrying the glass sheets 21 and 22, to be fused together around their edge portions, through the furnace. Arranged within the furnace 26 are a plurality of spaced sealing areas, such as are designated by the letters A and B, through which the glass sheets 21 and 22 are passed and in which the edge portions thereof are fused to one another.

In the production of all-glass multiple sheet glazing units according to the process disclosed herein, the two sheets of glass are passed through a sealing station, as at A, to form one edge wall and are then rotated to locate the edge portions of another side of the glass sheets in position to be sealed together, as in sealing station B. Thus, in FIG. 3, the sheets 21 and 22 are indicated as having been sealed together along the top and left hand edge and with the bottom edge positioned for the next sealing operation.

The support means 27 includes a beam 28 extending longitudinally within the furnace and mounted by transverse bars 29 on a carriage 30 that is supported on and translatable along a rail structure generally indicated at 31 in FIG. 4 and which is mounted exteriorly of the furnace.

Mounted on the carriage 30 are a pair of vacuum platens 32 and 33, one for each sheet of glass, which platens support the sheets in substantially vertical, spaced parallel relation with respect to one another while they are moved through the furnace and the edge portions thereof fused to one another. More specifically, the platen 32 is mounted by a bracket 34 on the beam 28 while the platen 33 is carried by a tubular bar 35 that is mounted on the carriage 30 by a bracket 36. The tubular bar 35 is adapted to be turned during forward movement of the carriage 30 and between the sealing stations to progressively rotate the glass sheets so that a succeeding pair of spaced edge portions will be brought into position to be sealed together.

The opposed surfaces of the platens 32 and 33 are each provided with suitably formed recesses 37 through which reduced air pressure or a vacuum can be applied to the glass sheets to support them against the platens. Communicating grooves 38 are formed in the surfaces of the platens to connect the recesses 37 with centrally formed bores 39 which, in one instance, connect with a suitable source of vacuum through a tube 40 and, in the other instance, through the hollow bar 35.

The furnace 26 (FIGS. 3 and 4) comprises a bottom wall 45, side walls 46 and 47 and a roof or top wall 48; the side wall 47 being provided with a horizontally disposed slot 49 through which the bars 29 and 35 project from the externally mounted carriage 30. The several walls of the furnace are all constructed of firebrick or other suitable refractory material. The bottom wall 45 is supported by longitudinally extending beams 50 carried by vertically disposed support legs 51. The furnace is heated by a suitable heating means such as electrical resistance filaments 52 located along the inner surfaces of the side walls 46 and 47 as shown in FIG. 2 or by gas burners of any well-known type.

At each of the sealing areas A and B, there is provided a sealing means which includes (FIGS. 3 and 5) a fusion burner assembly 55, an edge forming and shaping tool 56 and a polishing burner assembly 57, all mounted on a suitable frame 58 projecting upwardly through the bottom wall 45 of the furnace 26.

Briefly stated, each fusion burner assembly 55 for heating the marginal edge portions of the sheets to the desired fusion temperature of glass includes a pair of opposed burner heads 59 mounted on the frame 58 at opposite sides of the path and spaced apart to permit the glass sheets to pass therebetween. Each of the burner heads 59 comprises a body portion 60 having means 61 secured thereto for directing flames toward the sheets moving along the path.

In the illustrated embodiment, a plurality of nozzles or burner tips 62 are carried by each body portion arranged side by side in a substantially horizontal row extending along the path. The tips 62 are positioned to direct the heating flames in opposed streams toward the path to impinge on a portion of the lowermost edges of the sheets as the latter are carried past the fusion burner thereby to progressively raise the temperature of their edges to the softening point of glass.

Immediately upon being moved past the fusion burner assembly 55, the heat softened edge portions of the sheets are brought into engagement with an edge forming tool 56 which bends the edge portions toward one another and presses them into fusion contact to form the edge wall 23 of the unit.

As herein shown, the edge forming tool 56 comprises a pair of shaping rollers 63 fast to the upper ends of parallel, substantially vertical shafts 64 journaled at opposite sides of the path and rotatable therewith in a substantially horizontal plane. The uppermost peripheral edge of each of the rollers 63 is grooved as at 65 whereby the grooved portions cooperate to provide a semi-circular forming surface at the path. Thus, as the sheets are moved past the rollers 63, the forming surface engages the lowermost edge portions of the sheets and molds these edge portions into the semicircular edge wall shown in FIG. 2 and, at the same time, presses the edges into fusion contact with one another.

The shafts 64 carrying the rollers 63 are geared together as at 66 to rotate at the same speed but in opposite directions and are driven by a motor 67 working through a speed reducing mechanism 68 coupled to an extension of one of the shafts projecting downwardly beyond the floor of the furnace. The rate of rotation of the forming rollers 63 is proportional to the rate of movement of the sheets along the path so that as to avoid relative movement between the sheet edges and the forming surface.

As a final step in the edge sealing operation, the formed edge wall, upon emerging from between the forming rollers 63, passes over the polishing burner assembly 57 which directs flames upwardly to impinge on the edge wall. As shown in FIG. 5, the assembly 57 includes rows of angularly disposed burner tips 69 at opposite sides of the path and operable to direct flames angularly upwardly against the outer surface of the edge wall and an interposed row of substantially vertically disposed burner tips 70 extending along the path and positioned to direct flames upwardly against the edge wall as it passes thereover. These flames serve to firepolish the edge wall thereby to smooth out and remove any surface irregularities therein and, at the same time, to improve the strength of the edge wall.

Considering the completed glazing unit 20, as shown in its entirety in FIG. 1, the ideal configuration includes substantially planar side walls which merge at the periphery of the unit into a substantially semicircular edge wall. Thus, in cross section, the unit will have a uniform thickness throughout from edge wall to edge wall. To achieve this configuration requires that the edge portions of the sheets, which are to form the edge wall of the unit, be heated sufficiently to soften the glass to permit them to be molded to the desired shape by the forming tool. It will be appreciated, however, that should portions extending inwardly from the marginal edges of the sheet which lie adjacent the edge wall of the completed unit also be heated to the softening point of glass, there is a distinct possibility that the pressures exerted by the shaping tool to form the marginal edges will deform portions of the sheets inwardly of the edge wall of the completed unit. Specifically, such deformation may take the form of a bulge in the sides of the unit adjacent the edge wall whereby the unit will not have the desirable uniformity of thickness adjacent its peripheral edges.

As is true with a number of materials, glass has the characteristic of expanding when heated and, therefore, in the production of glazing units in the manner described, the heated areas of the sheets tend to grow in length during the edge fusion operation. This tendency to expand is readily absorbed by the heat softened glass and thus presents no particular problem as regards those marginal edges of the sheets which will ultimately form the edge wall. In any areas which are not heated to the softening point of glass but which are heated sufficiently to cause expansion, however, this expansion is accompanied by an increase in the dimensions of the sheet. If expansion of the glass in this area is restricted, the sheet bows or buckles to compensate for the increased dimensions. In the operation described, such restriction occurs when the two vertically disposed edge walls have been formed and the lowermost edges of the sheets are passed through a fusion burner. Then, since the opposite ends of the sheets are secured together, any expansion of the edges results in the sheets being bowed outwardly away from each other or caved inwardly toward each other with the result that the completed unit will not have the desired uniform thickness throughout.

To avoid these possibilities and to enable producing a unit having a uniform thickness throughout, in accordance with the present invention, the effect of the fusion burners 55 is confined to localized areas concentrated at those portions which will ultimately form the edge wall of the completed unit. Generally stated, this is accomplished by the utilization of an improved burner assembly 55 having nozzles or tips 62 operable to direct the heating flames against the desired localized area only and away from the inner portions of the sheets. The term "inner portions" in this specification is used to define all areas of the sheet lying within the marginal or periphery edge portions which are to be subsequently deformed in the manner described above to form the edge wall of the completed unit. Similarly, the term "marginal edge portions" is used to define only those areas which will be so deformed. Herein, this is accomplished by locating the burner tips inwardly of the marginal edge portions of the sheets and orientating the tips to direct the flames outwardly against the desired edge portions and away from the inner portions of the sheets.

Figure 7:
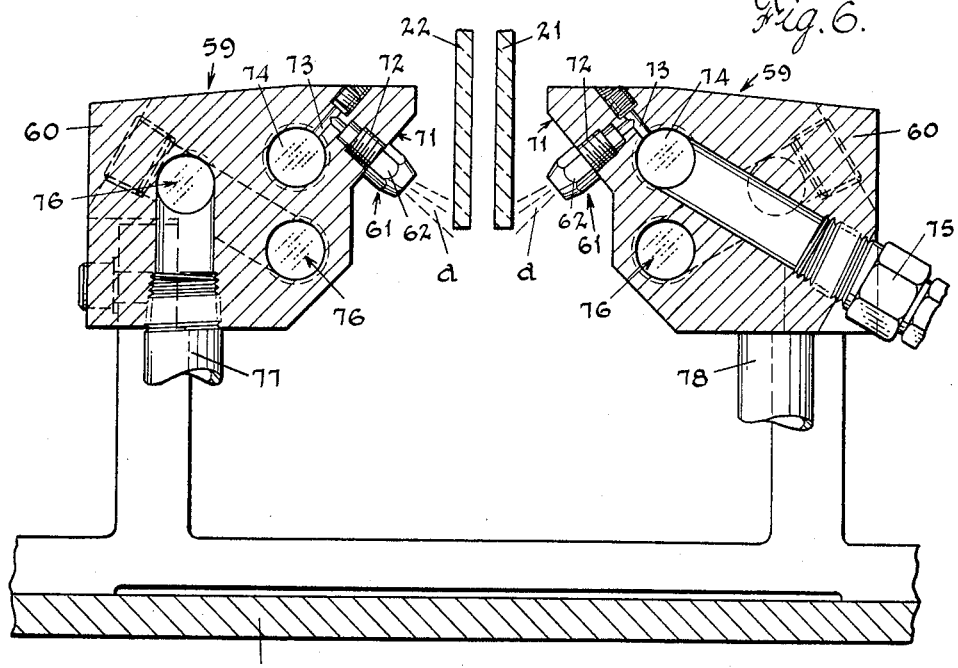
FIG. 7 is a transverse sectional view taken along line 7—7 of FIG. 5 showing the heating of a pair of glass sheets according to the method of the invention.

While the specific burner arrangement for accomplishing the foregoing results may vary, an exemplary and preferred organization has been illustrated in FIG. 7. As there shown, the burner tips 62 are disposed above the lowermost edges of the glass sheets and are directed downwardly against these edges whereby the flames $a$ emitting therefrom impinge upon a relatively narrow portion of the sheet edges and fan out below the sheets.

To locate the burner tips 62 in the desired angular relationship to the sheets moving along the path, the body portions 60 of the fusion burner assembly 55 extend upwardly above the lowermost edges of the glass sheets and their inwardly directed surfaces include an angular wall portion 71 inclined upwardly and inwardly toward the path. As shown in FIG. 7, these wall portions 71 are disposed above the lower edges of the sheets and present a face or surface directed downwardly toward the edges of the sheets and inwardly toward the path.

The burner tips 62 are received in threaded openings 72 in the wall portion 71 and project laterally outwardly therefrom. Each of the threaded openings 72 communicates, through a passage 73, with a manifold passageway 74 extending longitudinally through each body portion adjacent the row of burner tips and coupled by means of supply pipes 75 to a source of combustible gas (not shown).

To prevent the burner tips 62 from overheating, a suitable coolant such as water is circulated through interconnecting passageways 76 formed in the body portions. As herein shown, the coolant enters the passageways 76 in one of the body portions through a supply pipe 77, circulates through the passageway 76 which extends around the body portion and flows into a crossover pipe 78 which carries the coolant across the path and into a similar passageway 76 formed in the other of said body portions. The coolant then circulates through this passageway and to an outlet pipe 79 communicating therewith.

It will now be apparent that with a burner assembly constructed in accordance with the present invention, it is possible to localize the heat on the marginal edges of the sheets and thereby to avoid overheating of the portions of the sheet disposed inwardly of the marginal edges. In addition, with this arrangement, the heat is directed away from the platens supporting the sheets which insures that these platens will not be overheated causing them to warp or be otherwise damaged.

It is to be understood that the forms of the invention herewith shown and described are to be taken as illustrative embodiments only of the same, and that various changes in the shape, size and arrangement of parts may be resorted to without departing from the spirit of the invention.

We claim:
1. In apparatus for producing all-glass multiple sheet glazing units, supporting and conveying means to support two sheets of glass in spaced face-to-face relation and to carry them along a definite path through a heating chamber, a heating assembly disposed in said chamber adjacent said path, said heating assembly having directing means disposed on opposite sides of said path to direct heating flames toward said path, said directing means being disposed adjacent areas of said sheets located inwardly of the marginal edge portions thereof to direct said flames in an angular direction away from the inner portions of the sheets and onto said marginal edge portions thereby to bring said portions to the fusion temperature of glass as the sheets are carried thereby, and means disposed adjacent said path beyond said burner assembly to engage the heated marginal edge portions of the sheets and to urge them into fusion contact with one another.

2. In apparatus for producing all-glass multiple sheet glazing units, a heating chamber extending along a predetermined path, a heating asembly disposed within said chamber adjacent said path and having means disposed on opposite sides of the path for directing heating flames toward the path, supporting and conveying means adapted to support two sheets of glass in spaced face-to-face relation in a vertical position and to convey said sheets along said path through said heating chamber to move the lowermost edges of said sheets past said heating assembly and between said directing means, said directing means being positioned above said lowermost edges of the glass sheets to direct said heating flames angularly downwardly to impinge on the marginal portions of said lowermost edges, and means disposed adjacent said path beyond said heating assembly to engage the heated lowermost marginal edge portions of the sheets and urge them into fusion contact with one another.

3. In apparatus for producing all-glass multiple sheet glazing units, the combination of, means supporting two sheets of glass in spaced face-to-face relation in a substantially vertical position for movement along a predetermined substantially horizontal path, a burner assembly including body portions located at opposite sides of the path and spaced apart to permit the lowermost marginal edge portions of said sheets to pass therebetween, burner tips carried by each of said body portions above the lowermost edges of the glass sheets and being angled downwardly and toward said path to direct heating flames away from the inner portions of the sheets and onto the lowermost marginal edge portions of the sheets passing therebetween, means defining passageways in said body portions communicating with said tips carried thereby, means coupling said passageway to a supply of combustible gases, and forming means disposed adjacent said path to engage the heated edge portions of said sheets and urge them into fusion contact with one another.

4. In apparatus for producing all-glass multiple sheet glazing units, the combination of, means supporting two sheets of glass in spaced face-to-face relation in a substantially vertical position for movement along a predetermined path, a fusion burner disposed adjacent said path to heat the lowermost edges of said sheet to fusion temperature of glass, said fusion burner comprising body portions disposed at opposite sides of said path and spaced apart to permit the edges of said sheets to pass therebetween, a plurality of burner tips carried by each of said body portions in a position above said lowermost edges and being angled downwardly to direct heating flames away from the inner portions of the sheets and against said lowermost edges as the sheets pass therebetween, and forming means disposed adjacent said path to engage said heated marginal edges to urge the edges into fusion contact with one another.

5. In apparatus for producing all-glass multiple sheet glazing units, heating chamber extending along a predetermined path, a burner assembly disposed within said chamber and adjacent said path, means supporting two sheets of glass in spaced face-to-face relation for movement along said path through said heating chamber and past said heating assembly, said burner assembly including a pair of body portions spaced apart on opposite sides of said path to permit the sheets to pass therebetween, a plurality of nozzles carried by each of said body portions and arranged in opposed horizontal rows extending along said path, said nozzles being positioned adjacent areas of said sheets spaced inwardly of the marginal edges thereof to direct streams of heat in an angular direction relative to said sheets toward the path and away from the inner portions of the sheets to impinge on the marginal edge portions of the sheets thereby to raise the temperature of said marginal edge portions to the fusion point of glass as the sheets are carried thereby, and means disposed adjacent said path beyond said heating assembly to engage the heated marginal edge portions of the sheets and urge them toward one another and into fusion contact as the sheets are carried thereby.

References Cited by the Examiner

UNITED STATES PATENTS 2,761,249  9/1956  Olson et al. _____ 65—58

FOREIGN PATENTS 206,178  2/1957  Australia.

DONALL H. SYLVESTER, *Primary Examiner.*

D. CRUPAIN, *Assistant Examiner.*